_United States Patent Office_ 3,286,165
Patented Nov. 15, 1966

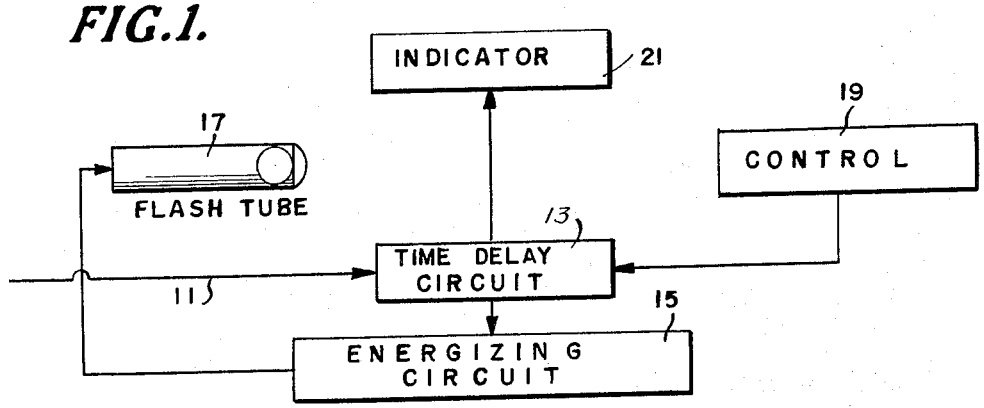
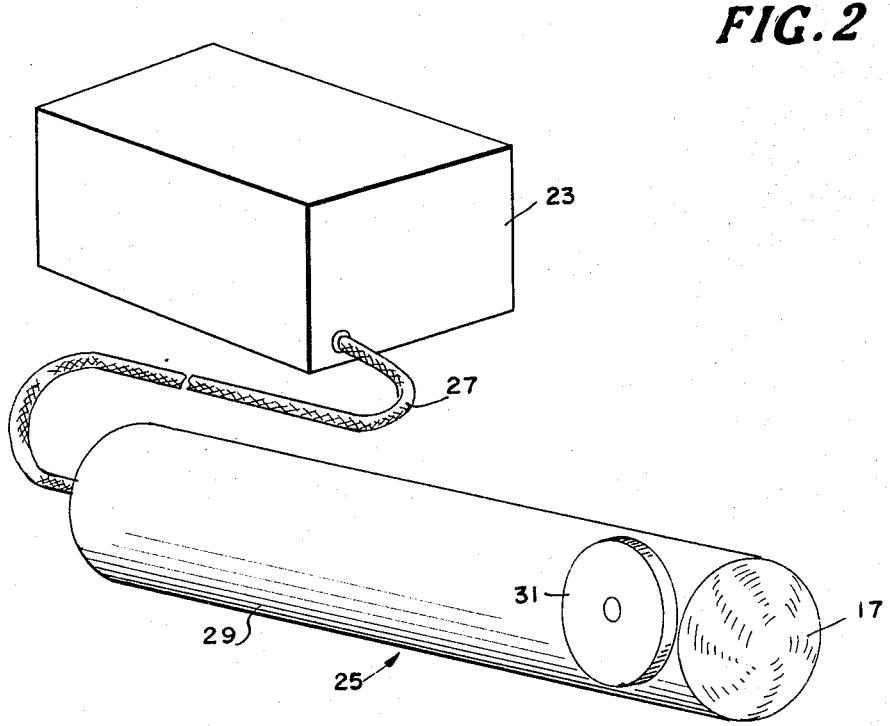

3,286,165
TIMING LIGHT SYSTEM FOR USE IN AUTO-
MOTIVE VEHICLE DIAGNOSTIC SYSTEM
Charles R. Small, Woodbury Heights, N.J., assignor to
Mobil Oil Corporation, a corporation of New York
Filed Nov. 30, 1962, Ser. No. 241,230
1 Claim. (Cl. 324—16)

This invention relates to systems for determining the basic timing and spark advance of automotive vehicles and more particularly to a system arranged to reduce the time required to obtain indications of basic timing and spark advance.

The system of the present invention is intended to be used in a diagnostic system which is designed to diagnose almost any condition needing correction in an automotive vehicle in the shortest possible time with a minimum of personnel. This diagnostic system is disclosed in the copending application Serial No. 241,214, entitled "Vehicle Diagnostic System," invented by George B. Myrtetus and Charles H. Pancoast, and filed on November 30, 1962. The copending application Serial No. 241,214 has been abandoned in favor of a continuation-in-part application Serial No. 276,702 of George B. Myrtetus and Charles H. Pancoast, entitled, "The Servicing of Automotive Vehicles Including the Diagnosis and Repair of Conditions of Automotive Vehicles Needing Correction," filed on April 30, 1963. The continuation-in-part application Serial No. 276,702 contains substantially all of the disclosures of the application Serial No. 241,214.

There have been developed many sophisticated techniques and equipment for testing and checking automotive vehicles for various defects, malfunctionings and other conditions which require correction. These techniques and equipment are all very specialized and are designed to diagnose only very specific conditions, Since there are a large number of conditions which might require correction, it is a long drawn out process to thoroughly test an automotive vehicle in order to provide diagnoses which will diagnose any condition in an automotive vehicle needing correction, particularly if such condition is not evident to the operator or owner of the vehicle. As a result it is not economically practical for a vehicle owner to pay to have this kind of diagnosis performed or for a garage to perform it. The usual procedure is to wait until trouble becomes disturbing and then perform tests to determine the cause of the particular trouble and correct it. This procedure often results in increased expense because the condition was not corrected soon enough. Moreover, since the vehicle owners are not willing to pay the cost of thorough testing and checking, it is not economically practical for a garage to keep on hand the expensive equipment required to perform the more sophisticated testing techniques. As a result many modern testing techniques, which would more accurately diagnose conditions requiring correction in the vehicle, are not available to the vehicle owner.

The diagnostic system disclosed in the above-mentioned copending application will completely test and check many automotive vehicles in a short period of time employing just two diagnosticians. Because the entire testing and checking procedure is performed in a short period of time with a minimum of personnel, it can be carried out for a nominal cost and for the first time it is economically practical to thoroughly test and check automotive vehicles so that the conditions can be corrected before they become expensive, thus saving the vehicle owners substantial repair costs.

In order for the diagnostic system of the above-mentioned copending application to be economically practical, the entire testing process must be carried out in just a few minutes. Thus time is of the essence and any feature which will save even a few seconds is important to the system, as it is only by these time saving features that the system becomes economically practical.

The timing light system of the present invention reduces the time to take readings of basic timing and spark advance and thus saves valuable time in the overall testing procedure of the diagnostic system disclosed in the above-mentioned copending application. Thus the timing light system of the present invention contributes substantially to the making of the diagnostic system of the above-mentioned copending application economically practical.

The timing light system of the present invention comprises a source of light, an energizing circuit which energizes the source of light in response to an enabling signal, and a time delay circuit which operates to apply an enabling signal to the energizing circuit in response to each applied input pulse to the system. The time delay circuit can either apply an enabling signal to the energization circuit immediately or after a selectively variable time delay. A manual control means is provided to vary the time delay to that the desired time delay can be selected. An indicator is provided which indicates the amount of the time delay provided by the time delay circuit. In the operation of the timing light system a diagnostician applies the high voltage pulses generated at the ignition wire of the No. 1 cylinder to the input of the timing light system and illuminates the timing marks on the engine of the vehicle with the source of light. The diagnostician can then determine the basic timing and the spark advance of the engine. In determining the spark advance, the diagnostician must select a delay with the manual control in accordance with his observation of the timing marks of the engine while they are illuminated with the light source. In accordance with the present invention the energization circuit, the time delay circuit and the indicator are all mounted in a main console while the manual control and the light source are mounted on a portable unit, which is connected to the main console by a flexible cable so that the portable unit is freely moveable with respect to the main console. Because the manual control is mounted on the portable unit instead of on the main console the diagnostician can adjust the amount of delay without moving away from the vehicle and valuable time is saved in the process of obtaining the basic timing and spark advance of the vehicles tested.

Accordingly, an object of the present invention is to provide an improved timing light system.

Another object of the present invention is to decrease the time to obtain indications of basic timing and spark advance in automotive vehicles.

A further object of the present invention is to provide a timing light system which will provide indications of basic timing and spark advance more quickly.

Further objects and advantages of the present invention will become readily apparent as the following detailed description of the invention unfolds and when taken in conjunction with the drawings wherein:

FIG. 1 is a block diagram illustrating the circuit of the timing light system of the present invention; and FIG. 2 illustrates the structure of the timing light system of the present invention.

As shown in FIG. 1 the input to the timing light system is designated by the reference number 11. Pulses from the ignition wire of the No. 1 cylinder are applied to this input, which is applied to a time delay circuit 13. In response to each high voltage pulse applied at input 11, the time delay circuit 13 triggers an energizing circuit 15, which in response thereto energizes a flash tube 17. A high voltage pulse will occur on the ignition wire of the No. 1 cylinder simultaneously with each firing of the No. 1 cylinder. Thus each time the No. 1 cylinder fires the flash tube 17 will be energized. The time delay circuit 13 will either trigger the energizing circuit 15 immediately in response to each high voltage pulse applied at input 11 or will trigger it after a time delay, which is continuously and selectively variable by means of a manual control 19. The time delay circuit 13 also applies a signal to an indicator 21, which provides a visual indication of the amount of delay provided by the time delay circuit 13.

As shown in FIG. 2 the timing light system comprises a housing or main console 23 and a remote flash unit 25 connected to the housing 23 by a cable 27. The time delay circuit 13, the energizing circuit 15 and the indicator 21 are mounted in the main console 23. The flash tube 17 and the manual control 19 are mounted on the remote flash unit 25. The interconnections between the flash tube 17 and the energizing circuit 15 and between the manual control 19 and the time delay circuit 13 are through the cable 27. The flash tube 17 and the control 19 are mounted in a barrel casing 29 which functions as a handle. The control 19 is manually operated by a knob 31. By adjusting the angular position of the knob 31, the delay provided by the time delay circuit 13 can be selected.

In operation a diagnostician illuminates the timing marks on the engine to which the input 11 is connected with the flash tube 17. This illumination will cause the timing marks to apparently stop in stroboscopic illusion at the position they are in each time the flash tube 17 is energized. The timing marks cooperate with a reference mark to indicate the position of the piston in the No. 1 cylinder relative to top dead center when the flash tube 17 is energized. In order to read basic timing, which is the position of the No. 1 cylinder relative to top dead center when it fires with no distributor induced spark advance, or in other words at idle speed, the diagnostician by means of the knob 31 selects no delay by the timing circuit 13 and the engine is operated at idle speed. The diagnostician then illuminates the timing marks with the flash tube and observes the indication, which will be the basic timing of the engine. In order to observe the spark advance at a particular speed, the engine is operated at the speed of interest and the knob 31 is adjusted until the indication of the timing marks is the same as that of basic timing. The delay indicated by the indicator 21 will be the spark advance at this particular speed. Because the control 19 is provided on the remote flash unit 25 instead of in the main console 23, the diagnostician is able to obtain the readings of basic timing and spark advance without leaving the engine of the vehicle to adjust the control 19 and valuable time in the testing process is saved.

Many modifications may be made to the above described specific embodiment of the invention without departing from the spirit and scope of the invention, which is defined in the appended claim.

What is claimed is:

A timing light system comprising a first unit, a portable unit moveable with respect to said first unit, a flexible cable connecting said first unit and said portable unit, a flash tube mounted on said portable unit, energizing means mounted on said first unit electrically connected to said flash tube through said flexible cable to energize said flash tube through said flexible cable in response to an enabling signal, time delay means mounted on said first unit electrically connected to said energizing means to apply an enabling signal to said energizing means in response to each applied input pulse after a time delay, an electrical input to apply to said time delay means ignition pulses from an automotive vehicle engine, means mounted on said first unit electrically connected to said time delay means to indicate the duration of said time delay, and manual control means mounted on said portable unit electrically connected to said time delay means through said flexible cable to selectively vary the duration of said time delay.

References Cited by the Examiner
UNITED STATES PATENTS

| | | | |
|---|---|---|---|
| 2,213,297 | 9/1940 | Zitzman | 324—17 |
| 2,703,376 | 3/1955 | Board. | |
| 2,749,481 | 6/1956 | Klein | 315—208 |
| 2,968,765 | 1/1961 | Parmater | 324—15 |

OTHER REFERENCES

German printed application No. 1,014,390, pub. Aug. 22, 1957.

WALTER L. CARLSON, *Primary Examiner.*

FREDERICK M. STRADER, *Examiner.*

C. W. HOFFMANN, M. J. LYNCH,
*Assistant Examiners.*